April 8, 1930.                T. PIEKOS                1,753,217
                         DOUGH CUTTING MACHINE
                         Filed April 20, 1928        2 Sheets-Sheet 1
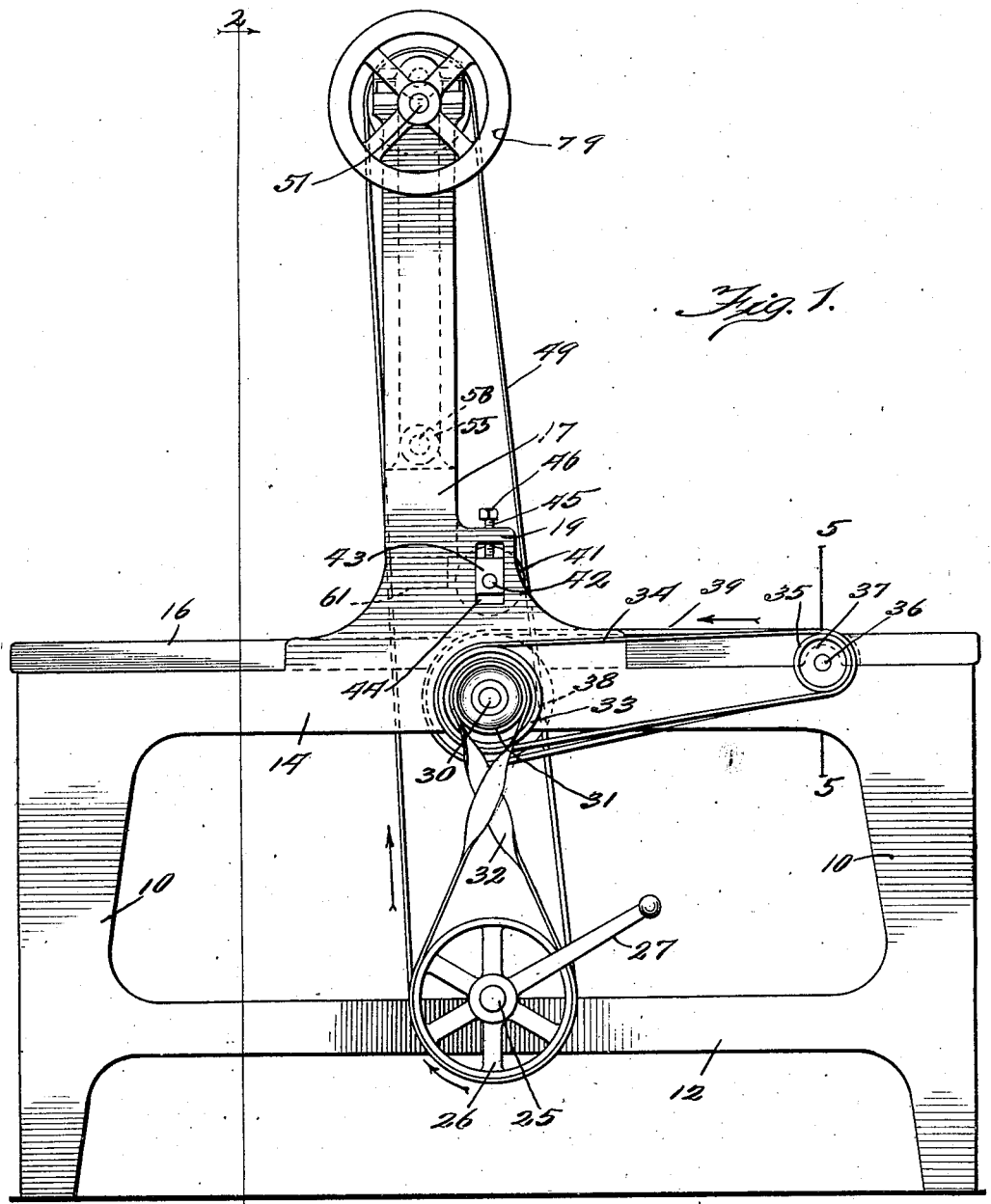
Fig. 1.
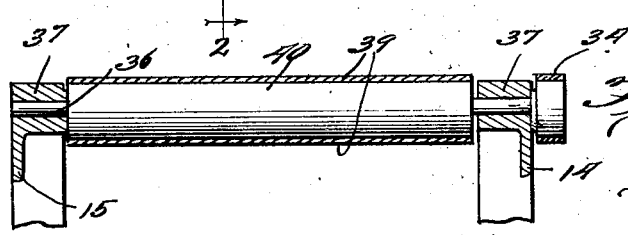
Fig. 5.    Inventor:
           T. Piekos
        By B. Piechowicz
                  Atty.

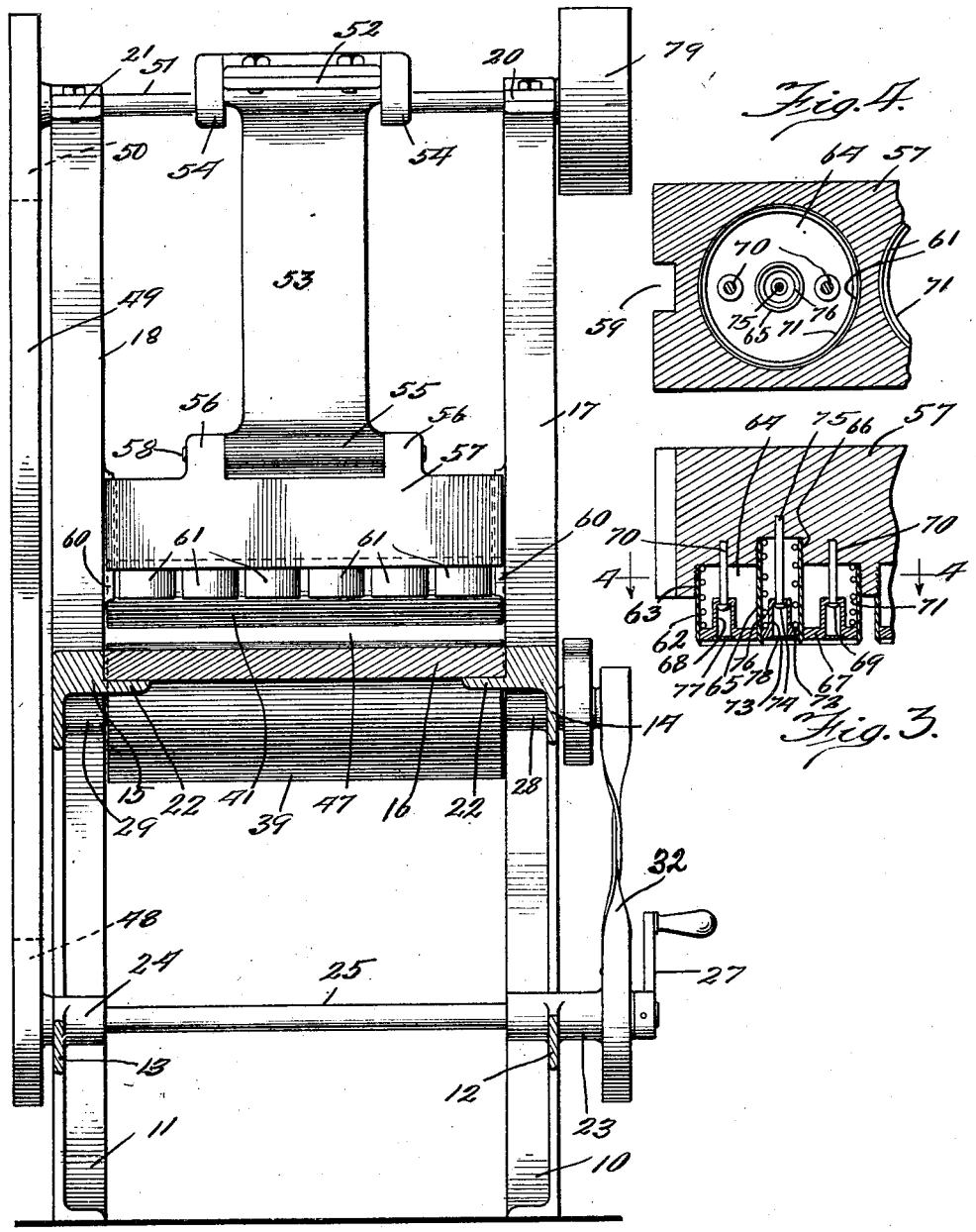

Patented Apr. 8, 1930

1,753,217

UNITED STATES PATENT OFFICE.

TADEUSZ PIEKOS, OF WEST LYNN, MASSACHUSETTS, ASSIGNOR OF ONE-HALF TO SCEPAN BACZEWSKI, OF LYNN, MASSACHUSETTS

DOUGH-CUTTING MACHINE

Application filed April 20, 1928. Serial No. 271,421.

The present invention relates to dough cutting machines and has for its main object the provision of a machine whereby the dough may be passed through suitable means for the purpose of rolling the same and as the same becomes rolled, to cut it by suitable means and impart to the same usual shapes or forms, as doughnuts, etc.

Another object of the present invention is the provision in a machine of the character indicated of cutting knives or the like which would cut the dough into suitable dough pieces, such as doughnuts, and which knives may eject the cut pieces of dough.

A still further object of the invention is the provision of a dough cutting machine provided with rolling means and cutting means, and which two means may be operable simultaneously by the same power.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Fig. 1 is a side elevational view of the machine;

Fig. 2 is a side view of the machine, partly in section and partly in elevation, the view having been taken in line 2—2 of Fig. 1;

Fig. 3 is an enlarged cross-sectional view through one of the cutting knives used in connection with the present device;

Fig. 4 is a horizontal cross-sectional view of the cutting means on line 4—4 of Fig. 3; and Fig. 5 is a transverse cross-sectional view on line 5—5 of Fig. 1.

Referring to the drawings in detail there is shown therein a frame including a pair of legs 10 on one side of the machine and a pair of similar legs 11 on the opposite side thereof. Each respective pair of said legs 10 and 11 is connected by braces 12 and 13, which are positioned or located at the lower ends of the respective pair of said legs, but the two braces being on substantially the same horizontal plane. The two pairs of legs 10 and 11 are further connected by upper braces 14 and 15, respectively, upon which rests platform or table 16.

Substantially from central portions of said braces 14 and 15 upright standards 17 and 18, respectively, upwardly project and are integrally formed therewith. Said standards 17 and 18 are in parallel relation in respect of each other on upright transverse plane through the machine.

As clearly seen on Fig. 1 said standards 17 and 18 are wider at their bases, later assuming a narrower shape affecting heads 19, for the purposes hereinafter described, and from there uniformly assuming narrower shapes and projecting upwardly, and terminating in bearings 20 and 21, as clearly seen on Figs. 1 and 2.

Platform 16 rests upon legs 10 and 11 and braces 14 and 15. Substantially at the central portion of said platform 16 is cut away on each side permitting clearance by the bases of said standards 17 and 18, as clearly seen on Fig. 2, and in order to provide supports on each side of said platform 16 where the same is reduced ledges 22 are provided which project horizontally and inwardly from each of the braces of said standards 17 and 18 and which are integrally formed therewith.

Braces 12 and 13 substantially at their central portions are provided with bearings 23 and 24, respectively, which are integrally formed with said braces, and are adapted for supporting shaft 25, which is positioned transversely of the machine and which is adapted for rotation within said bearings. Mounted upon the end of shaft 25, which is adjacent brace 12, is wheel 26 and a crank handle 27 by means of which the machine may be manually operated. Directly above said shaft 25 and positioned for rotatable movement within bearings 28 and 29, which are integrally formed with braces 14 and 15, respectively, is shaft 30, which has at one of its ends wheel 31 rigidly mounted thereon. Said wheels 26 and 31 are in vertical alinement and are connected by a crossed belt 32 by means of which the rotation of shaft 25 is transmitted to said wheel 31 and shaft 30, it being noted that due to the crossed belt 32 said shafts 25 and 30 will be rotated in opposite directions.

Rigidly mounted upon said shaft 30 and interposed between wheel 31 and brace 14 is an enlarged wheel 33, the latter by means of belt 34 connecting with wheel 35, which is keyed upon the corresponding end of shaft 36 which is likewise set within braces 14 and adapted for rotation within bearings 37, at the rear end of the machine.

Rigidly mounted upon shaft 30 and positioned between braces 14 and 15 is a comparatively large drum or roller 38, portion of which projects above the upper face of platform or table 16, as clearly seen on Fig. 2. Said drum 38 is adapted to carry a comparatively wide endless belt or conveyer which passes over drum 40 which is rigidly mounted upon shaft 36, said latter drum being likewise interposed between braces 14 and 15. To accommodate belt 39 platform 16 is cut away the upper portion of said belt 39 being in effect a substantial continuation of the upper face of said platform 16.

Above said shaft 30 and between heads 19 of standards 17 and 18 is a roller 41 which is rigidly mounted upon shaft 42, the ends of said shaft 42 being positioned within bearing blocks 43 which are set within oblong upright openings 44 made in heads 19, and within which said bearing blocks 43 are adapted for vertical adjustment for the purpose of shifting roller 41 to or away from drum 38. This is accomplished by means of screws 45, which pass through and are in threaded engagement with the upper portions of heads 19 immediately above openings 44. The lower ends of said screws 45 are in engagement with the upper portions of bearing blocks 43, in such a way as to permit the independent rotation of said screws 45 with respect to said bearing blocks 43. By virtue of the arrangements hereinabove described by turning down screws 45 by their heads 46 bearing blocks 43 will be shifted downwardly within slots 44, by means of which action shaft 42, and consequently roller 41 will be brought down toward drum 38. Conversely, when screws 45 are turned up bearing blocks 43 will be shifted upwardly bringing therewith shaft 42 and roller 41 away from said drum 38. This arrangement permits the regulation of roller 41 for decreasing or increasing slot 47 between said drum 38 or more specifically belt 39. This will permit the compression of the dough into thinner or thicker layers as the same passes between said roller 41 and drum 38 as will be hereinafter described.

The opposite end of shaft 25 carries a rigidly mounted belt wheel 48 which, by means of endless belt 49 connects with wheel 50 which is mounted upon the corresponding end of crank shaft 51 which is positioned upon the upper ends of standards 17 and 18 and which is adapted for rotation within bearings 20 and 21. As seen on Fig. 2, said wheels 48 and 50 are positioned upon their respective shafts and remain on the outside of the adjacent side of the machine, including legs 11, braces 13 and 15, and standard 18.

Pivotally mounted upon said crank shaft 51 by means of its head 52 is crank bar 53, said head 52 being positioned between crank webs 54. The lower enlarged end 55 of crank bar 53 is positioned between lugs 56 upwardly projecting from head 57, said enlarged end 55 being pivoted upon said head 57 by means of pin 58 passing through said lugs 56 and enlarged end 55 of crank bar 53. Said head 57 at each of its ends, and centrally thereof, has upright recesses 59 wherein guiding rails 60 integrally formed with and inwardly projecting from standards 17 and 18, fit. Thus when said head 57 moves up and down the same is guided by means of said guiding rails 60 and the displacement of said head 57 from within said standards 17 and 18 is prevented. It is observed that said head 57 is positioned in front of roller 41. Said head 57 at its lower end carries a plurality of cutting knives 61, which are shown in detail on Figs. 3 and 4.

Said knives 61 are more particularly adapted for cutting out doughnuts, and each includes a cylindrical member 62 of comparatively large diameter, and which is mounted within the lower end of head 57 by means of the upper threaded portion 63 of said cylindrical member 62, to accommodate said cylindrical member 62 the head 57 having round cavities 64 having threaded periphery for engaging the upper threaded portion 63 of cylindrical cutter 62. Each of said knives further includes another cylindrical cutter 65 of narrower diameter and which is adapted for positioning within head 57 centrally of cavity 64 and cylindrical cutter 62. Said cylindrical cutter 65 has outwardly threaded upper portion 66 for engaging the threaded periphery of the bore made in head 57 and centrally of cavity 64. Both of said cutters 62 and 65 have their respective lower edges sharpened to readily cut the dough. Positioned within the lower end of cylindrical cutter 62 is a washer-plate 67, through the central open portion of which the lower end of cylindrical cutter 65 projects. Said washer plate 67 at two diametrically opposite points is provided with upwardly projecting hollow studs 68, each of which encloses heads 69 of pins 70, the upper ends of said pins being embedded in head 57. Interposed between the upper horizontal wall of cavity 64 and the upper face of washer-plate 67 is a coil spring 71, which, being contracted, exerts at all times the pressure upon washer plate 67. Heads 69 of pins 70 engaging the upper horizontal walls of studs 68 prevent further downward movement of said plate and the disengagement thereof when under the pressure of said spring 71 from within the cylindrical cutter 62 is prevented.

Positioned within the lower end of cylindrical cutter 65 is plug 72 from the central portion of which hollow cylindrical stud 73 upwardly projects. Said stud encloses head 74 carried by the lower end of pin 75 whose upper end is embedded in head 57, said pin passing through the horizontal wall of said stud 73. Interposed between head 57 and plug 72 is a contracted coil spring 76 exerting pressure upon said plug 72, said head 74 engaging the horizontal wall of stud 73 prevents further downward movement of plug 72 and consequent disengagement of said plug 72 from within cylindrical cutter 65.

The openings in washer-plate 67 and plug 72 resulting from studs 68 and 73, respectively, are plugged by disks 77 and 78, respectively, so that the lower face of said washer plate 67 and plug 72, respectively, present uniform and smooth surface.

It is observed that the lower cutting edges of cylindrical cutters 62 and 65 remain in the same plane and simultaneously engage the dough. Likewise washer plate 67 and plug 72 also remain on the same plane in the inoperative position of each of the cutters as plainly seen on Fig. 3.

Referring to the operation of the machine, assuming that wheel 2 is rotated in the direction indicated by arrow on Fig. 1, by actuating the same by crank handle 27 shaft 30 with its wheel 31 and 33 and its drum 38 will be rotated in the opposite direction. Since the wheel 33 is connected by endless straight belt 34 with wheel 35 on shaft 36, last mentioned wheel 35 will likewise rotate in the direction opposite to the rotation of wheel 26. Therefore, belt 39 passing over drums 38 and 40 will travel in the direction indicated by arrow on Fig. 1. The upper portion of said belt 39 will act as a conveyer of dough placed upon said belt for conveying the same and causing its passage between the roller 41 and drum 38. The dough thus passing between said roller 41 and drum 38 will become flattened and prepared for the action of cutters 61. It is further noted that said cutters operate upon the prepared and rolled dough upon the end of platform 16 which is adjacent to drum 38 or more specifically belt 39.

The rotation of shaft 25 will cause the rotation of belt 49 in the same direction, which in turn will cause the rotation of crank shaft 51, the latter in turn through the medium of crank bar 53 will cause reciprocating upright movement of head 57 and cutters 61. The fly wheel 79 at the other end of crank shaft 51 will impart a smooth and even rotation to said crank shaft 51.

From the hereinabove described operation it will be seen that the lower ends of cutters 61 will intermittently be brought toward platform 16 and away from it. The guiding rails 60 will prevent the displacement of said head and cutters 61 and will insure the regular strokes of said cutter 61 at the dough which will find itself immediately below said cutters as the same passes from between roller 41 and drum 38.

The thickness of the dough or the degree of desired compression thereof is regulated by means of bearing blocks 43 and screws 45. By tightening said screws 45 on bringing the same down shaft 42 with its roller 41 will be brought toward drum 38 which action will decrease the size of slot 47 between said roller 41 and drum 38. Conversely, on bringing said screws 45 up roller 41 will be moved upwardly and farther away from said drum 38.

Cutters 61 on striking the prepared dough remaining upon platform 16 immediately below said cutters will cut the dough into desired figures corresponding to the shape of the particular cutters, it being noted that the cutters illustrated on the drawings are particularly adapted for cutting doughnuts.

As is apparent from the drawings the lower sharp edges of cylindrical cutters 62 and 65 will cut in the dough circles corresponding in size to said cutters 62 and 65 from which will result a doughnut coresponding in shape to the washer plate 67.

Under the pressure of the dough as the lower edges of cylindrical cutters 62 and 65 remain in their operative position upon platform 16 washer plate 67 and plug 72 will yield upwardly against the pressure of their respective springs 71 and 76 and as soon as said cutters 61 are brought upwardly with head 57 under the action of crank bar 53 the pressure of the dough upon the lower faces of said washer plate 67 and plug 72 will be released and springs 71 and 76 will cause the ejectment of the dough remaining within the respective cylindrical cutters 62 and 65. The ejected dough will fall upon platform 16 and the continuing layer of dough passing from between roller 41 and drum 38 will push the cut doughnuts farther away from roller 41 and drum 38 and from the path of cutters 61.

While there is described herein a preferred embodiment of the present invention, it is nevertheless to be understood that minor changes may be made without departing from the spirit and scope of the invention as claimed.

What I claim as new is:

1. In a dough cutting machine, a cutter head comprising a plurality of circular cutting members arranged concentric to each other in spaced relation and having screw threaded engagement with the head to be readily removable, movable plates of a shape to substantially fit the spaces between the concentric cutters, and each plate having a hollow stud, pins having heads retained in the hollow studs to limit the movement of the plates, springs beneath the plates for normally urging the plates toward the cutting edges of the members to free from the members the objects cut thereby, and fillers in the openings in the studs to preserve the continuity of the surface of the plates.

2. In a dough cutting machine, a cutter head having a cylindrical chamber therein, the walls of which are screw-threaded, a second cylindrical chamber of less diameter than the first and concentric therewith and formed in the bottom of the first chamber and the walls thereof being screwthreaded, a pair of circular cutters, one fitting into the large chamber and the other into the small chamber, and both of said cutters being screwthreaded for detachable engagement with the walls of the chambers, the cutting edges of the cutters being in the same transverse plane, a pair of movable ejector plates, one fitting between the large cutter and the small cutter, and the other in the space between the edges of the small cutter, and both plates having studs, pins carried by the cutter head and formed with heads working in the studs for limiting the movement of the ejector plates, and a pair of coil springs, one fitting within each of the cutters and bearing against the bottoms of the cavities or chambers and against the ejector plates to urge the ejector plates toward the respective cutting edges for the purpose defined.

In testimony whereof I affix my signature.

TADEUSZ PIEKOS.